May 10, 1932.  R. BERTHON  1,857,132

DIAPHRAGM FOR OPTICAL SYSTEMS

Filed March 21, 1928

INVENTOR
Rodolphe Berthon
BY
Gifford, Scull & Burgess
ATTORNEYS.

Patented May 10, 1932

1,857,132

UNITED STATES PATENT OFFICE

RODOLPHE BERTHON, OF NEUILLY, FRANCE, ASSIGNOR, BY MESNE ASSIGNMENTS, TO KISLYN CORPORATION, OF NEW YORK, N. Y., A CORPORATION OF DELAWARE

DIAPHRAGM FOR OPTICAL SYSTEMS

Application filed March 21, 1928, Serial No. 263,335, and in France March 21, 1927.

This invention refers to the application, to optical systems used either for picture taking or for copying or projecting negatives on line-net goffered or striated films for the purpose of reproduction in colours, of a linear diaphragm arranged according to one diameter of the optical system concerned and perpendicularly to the direction of the lines or striations of the network.

Persons skilled in the art are aware that the production of coloured negatives on line-net films is effected by means of juxtapositioned trichrome screens arranged at the nodal point of the camera parallelly to the direction of the lines of the net printed on the film (or included in its backing). A circular diaphragm cannot, therefore, be used, since, in proportion as it would become closed, it would trespass proportionately more on the side screens than on the central screen and would thus alter the relation of colours. Hence, if the speed of the lens is desired to be reduced by means of a diaphragm, the latter cannot be a circular one; it must be linear and set perpendicularly to the trichrome screens and, consequently, to the direction of the striations of the film. But the duty of the linear diaphragm is not limited to the eventual decreasing of the speed of the lens; it plays, furthermore, an essential part with respect to the effects of internal reflection that take place in the striated film, so that its use is imperative, at any rate for picture taking and for copying, whenever a striated film is employed. Moreover, it has a selective action as regards the intensity of the rays that pass through the various zones of the camera and it enables, by means of an accurate and nice apportioning of the rays possessing a spherical correctness and of those affected by residual spherical aberration, the disappearance of waterings to be considerably facilitated in copying.

Figure 1:
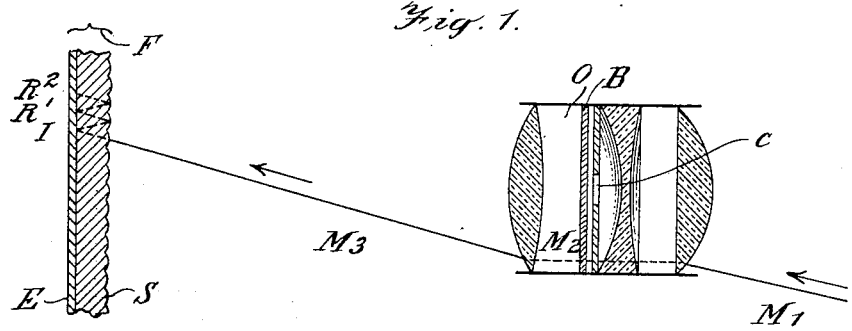
Figure 2:
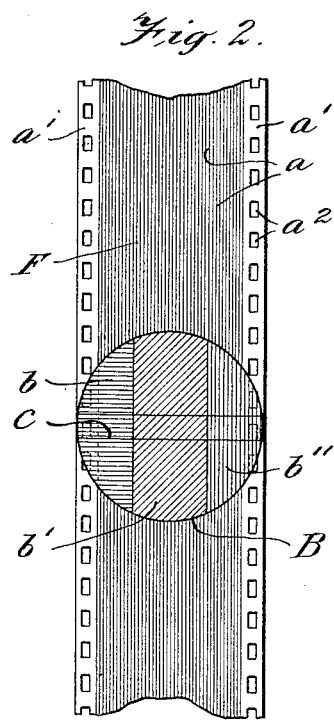

The part played by the linear diaphragm in suppressing the internal reflections of the film will be understood more readily upon consideration of the accompanying drawings, wherein Figures 1 and 2 are, respectively, a diagrammatic sectional view showing a wide-angle lens and a striated film whereon an image is being projected, and a face view of a fragment of film.

In Fig. 1, O indicates the aforesaid lens, and F the film; the section line of the latter is being parallel with the striations $a$ of the film (see Fig. 2), which are themselves parallel, or substantially so, with the marginal portions $a'$ of the film. The path of a marginal ray is represented in Fig. 1 at M1, M2, M3; and it will be observed that, after passing through the backing S of the film, the ray is partly reflected by emulsion E to the free face of the backing and then returned to the emulsion. A series of successive reflections R1, R2—may thus take place, producing around the image point I a halo zone which is detrimental to the sharpness of the image; and it will readily be understood that if the light ray is limited to the part adjacent the optical axis, such reflections will be grouped much more closely around said image point and the halo will be correspondingly reduced.

Figure 2 represents a portion of the film F itself; $a$ indicating the parallel, or substantially parallel, striations and $a'$ the marginal portions provided with the usual feed perforations $a^2$. The trichrome filter is indicated at B, and its colour zones $b$, $b'$, $b''$ are disposed vertically, or, speaking more precisely, the lines that separate the colours, are parallel with the striations $a'$ of the film. Finally, the linear diaphragm $c$ is disposed perpendicular to the aforesaid separating lines.

The action of the linear diaphragm on the selection of the rays which possess some spherical aberration is much more complex and is of technical importance only as concerns copying. It is based on the following considerations: any lens spherically corrected for marginal rays, maintains "zones of spherical aberration", the maximum of which is generally situated on the circumference corresponding to two-thirds of the total lens or camera aperture. The importance of said "zones" is such that the focussing generally has to be modified every time the diameter of the diaphragm of the camera is altered, due to the fact that the rays admitted according to the incompletely corrected zones may acquire, according to the diaphragm, more intensity than the corrected rays from the center of the camera.

By applying to a camera a diametrical linear diaphragm $c$ of suitable width, it is possible to give an equal importance to the corrected rays and to the aberrent rays; consequently, the image will be formed on an infinite series of planes proceeding from the plane corresponding to the maximum aberration to the plane of the main focus, thus creating a factitious "depth of field" of equal sharpness. If this depth of field is of the same order of magnitude as the striations formed on the film (or included in its backing) it will be readily realized that said striations cannot be sharply projected through space. When projecting a striated film, by means of a camera with a linear diaphragm, upon another striated film, the waterings due to superimposition of the two nets will, therefore, be all the less visible the more perfectly the "blurring" of the first network will have been effected by using a linear diaphragm.

I claim as my invention:

In combination, a striated film for color photography, an optical system adapted to pass light to or from said film, a color filter associated with said system and comprising color zones extending parallel with the striations on said film, and a diaphragm adjacent said filter and having a relatively narrow fixed opening extending transversely of said zones and of substantially uniform width throughout its length.

In testimony whereof I affix my signature.

RODOLPHE BERTHON.